United States Patent
David et al.

(10) Patent No.: US 7,481,563 B2
(45) Date of Patent: Jan. 27, 2009

(54) LED BACKLIGHT

(75) Inventors: John R. David, Stillwater, MN (US);
Ellen O. Aeling, St. Paul, MN (US);
Michael A. Meis, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 103 days.

(21) Appl. No.: 11/534,028

(22) Filed: Sep. 21, 2006

(65) Prior Publication Data

US 2008/0074901 A1    Mar. 27, 2008

(51) Int. Cl.
*G01D 11/28* (2006.01)
(52) U.S. Cl. .................................. 362/612; 362/613
(58) Field of Classification Search .............. 362/27, 362/247, 812, 600
See application file for complete search history.

(56) References Cited

U.S. PATENT DOCUMENTS

| | | | |
|---|---|---|---|
| 3,746,853 A | 7/1973 | Kosman et al. |
| 4,134,096 A | 1/1979 | Denes |
| 4,439,818 A | 3/1984 | Scheib |
| 4,588,258 A | 5/1986 | Hoopman |
| 4,682,147 A | 7/1987 | Bowman |
| 4,775,219 A | 10/1988 | Appledorn et al. |
| 5,105,568 A | 4/1992 | Branning |
| 5,122,902 A | 6/1992 | Benson |
| 5,136,479 A | 8/1992 | Ruffner |
| 5,138,488 A | 8/1992 | Szczech |
| 5,167,556 A | 12/1992 | Stein |
| 5,367,441 A | 11/1994 | Wustlich |
| 5,450,285 A | 9/1995 | Sclemmer |
| 5,469,347 A | 11/1995 | Duve et al. |
| 5,751,388 A | 5/1998 | Larson |
| 5,793,456 A | 8/1998 | Broer et al. |
| 5,803,579 A | 9/1998 | Turnvull et al. |
| 5,825,543 A | 10/1998 | Ouderkirk et al. |
| 5,840,405 A | 11/1998 | Shusta et al. |
| 5,867,316 A | 2/1999 | Carlson et al. |
| 5,882,774 A | 3/1999 | Jonza et al. |
| 6,052,164 A | 4/2000 | Cobb, Jr. et al. |
| 6,096,247 A | 8/2000 | Ulsh et al. |
| 6,122,103 A | 9/2000 | Perkins et al. |
| 6,208,466 B1 | 3/2001 | Liu et al. |
| 6,280,822 B1 | 8/2001 | Smith et al. |
| 6,287,670 B1 | 9/2001 | Benson et al. |
| 6,330,111 B1 * | 12/2001 | Myers ........................ 359/599 |
| 6,331,915 B1 | 12/2001 | Myers |

(Continued)

FOREIGN PATENT DOCUMENTS

DE    20012380 U1    12/2000

(Continued)

*Primary Examiner*—Anabel M Ton
(74) *Attorney, Agent, or Firm*—Colene H. Bank

(57) ABSTRACT

An LED backlight assembly is disclosed. The assembly includes a housing having a plurality of internal surfaces. At least one of the internal surfaces is a light emission surface and an opposing surface is a reflective surface. An optical film is disposed between the light emission surface and the reflective surface. The optical film includes at least one of a diffusing film, a reflective polarizing film, a multilayer optical film, and a structured surface film. An array of LEDs in electrical communication is disposed on the optical film. At least one LED of the array of LEDs has an illumination field that is directed toward the reflective surface.

20 Claims, 2 Drawing Sheets

U.S. PATENT DOCUMENTS

| | | |
|---|---|---|
| 6,354,709 B1 | 3/2002 | Campbell et al. |
| 6,491,412 B1 * | 12/2002 | Bowman et al. ............ 362/249 |
| 6,531,230 B1 | 3/2003 | Weber et al. |
| 6,752,505 B2 | 6/2004 | Parker et al. |
| 6,771,335 B2 | 8/2004 | Kimura et al. |
| 6,788,463 B2 | 9/2004 | Merrill et al. |
| 6,846,089 B2 | 1/2005 | Stevenson et al. |
| 7,195,364 B2 * | 3/2007 | Hahm et al. ................ 362/27 |
| 2002/0057567 A1 | 5/2002 | Chen |
| 2002/0159019 A1 | 10/2002 | Pokorny et al. |
| 2003/0218878 A1 | 11/2003 | Swaris et al. |
| 2005/0024754 A1 | 2/2005 | Epstein et al. |
| 2005/0136200 A1 | 6/2005 | Durrell et al. |
| 2005/0174802 A1 | 8/2005 | Wu et al. |
| 2005/0265042 A1 | 12/2005 | Kim et al. |
| 2006/0039129 A1 | 2/2006 | Coghlan et al. |
| 2006/0146530 A1 | 7/2006 | Park et al. |
| 2006/0146562 A1 | 7/2006 | Ko et al. |
| 2008/0074901 A1 * | 3/2008 | David et al. ................ 362/612 |

FOREIGN PATENT DOCUMENTS

| | | |
|---|---|---|
| GB | 2 360 868 | 10/2001 |
| JP | 2001-092396 | 4/2001 |
| JP | 2004-0437714 | 12/2004 |
| JP | 2005-017573 | 1/2005 |
| JP | 2006/284906 | 10/2006 |
| WO | 1989/05524 | 6/1989 |
| WO | WO 02-089101 | 11/2002 |
| WO | WO 03-083529 | 10/2003 |

* cited by examiner

LED BACKLIGHT

BACKGROUND

The present disclosure relates generally to LED backlight assemblies.

Light emitting diodes (LEDs) are used as light sources for a variety of applications. Some LED light source applications include commercial graphic displays and other lighted displays. An LED emission pattern can vary from a narrow, forward directed beam to a wide cone. Side emitting LEDs are also used in some applications.

In these applications, the LEDs are normally placed on the back or the side of a backlight. When LEDs are placed on the back of the backlight, bright spots caused by the LED sources can be visible in the backlight output, thereby causing a non-uniformly lit sign box or display.

In these applications, placing diffusers in the backlight can minimize the bright spots. These diffusers can reflect the light around the backlight to homogenize the emitted light, but every reflection can cause a loss of light, and the diffuser can also reduce transmitted light.

Another way to reduce the perceived LED bright spots in a signbox or display is to make the signbox or display deeper. However, this also causes a loss of brightness due to increasing distance from the light source to the display or sign face (light emission surface). It can also result in significant cost increases due to the need for additional materials.

SUMMARY

In one aspect, the present disclosure provides an LED backlight assembly that includes a housing having a plurality of internal surfaces. At least one of the internal surfaces is a light emission surface, and an opposing surface is a reflective surface. An optical film is disposed between the light emission surface and the reflective surface. The optical film includes at least one of a diffusing film, a reflective polarizing film, a multilayer optical film, and a structured surface film. An array of LEDs in electrical communication is disposed on the optical film. At least one LED of the array of LEDs has an illumination field that is directed toward the reflective surface.

In another aspect, the present disclosure provides an LED backlight assembly that includes a housing having a plurality of internal surfaces. At least one of the internal surfaces is a light emission surface and an opposing surface is a reflective surface. An optical film is disposed between the light emission surface and the reflective surface. The optical film includes at least one of a diffusing film, a reflective polarizing film, a multilayer optical film, and a structured surface film. The optical film is non-planar, and portions of the optical film are disposed on the reflective surface. An array of LEDs in electrical communication is disposed on the optical film. At least one LED of the array of LEDs has an illumination field that is directed toward the reflective surface.

In another aspect, the present disclosure provides a method of making an LED backlight assembly. The method includes providing a housing having a plurality of internal surfaces, where at least one of the internal surfaces is a light emission surface and an opposing surface is a reflective surface; disposing an array of LEDs and conductors on an optical film, where the optical film includes at least one of a diffusing film, a reflective polarizing film, a multilayer optical film, and a structured surface film; and placing the optical film between the light emission surface and the reflective surface such that at least one LED of the array of LEDs has an illumination field directed toward the reflective surface.

These and other aspects of the LED backlight assembly according to the subject disclosure will become readily apparent to those of ordinary skill in the art from the following detailed description together with the drawings.

BRIEF DESCRIPTION OF THE DRAWINGS

So that those having ordinary skill in the art to which the subject disclosure pertains will more readily understand how to make and use the subject disclosure, exemplary embodiments thereof will be described in detail below with reference to the drawings, in which.

DETAILED DESCRIPTION

Figure 1:
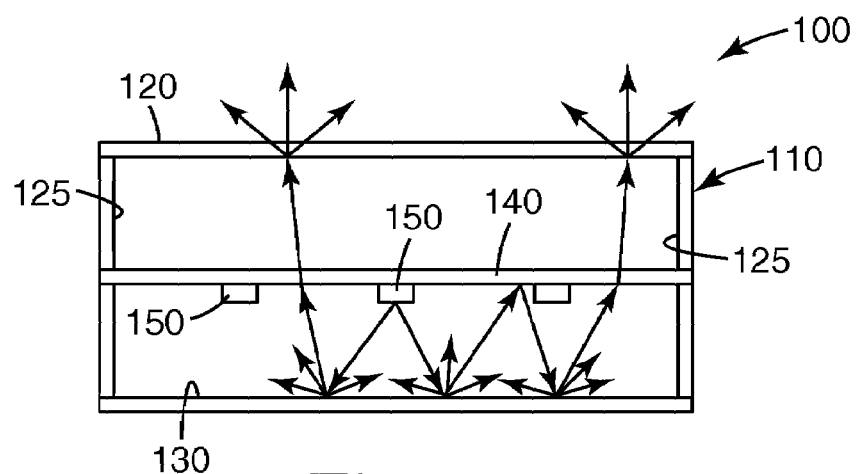
FIG. 1 is a schematic cross-sectional diagram of one illustrative LED backlight assembly.

This disclosure describes LED backlights. The LEDs in these LED backlights are positioned so that the LEDs do not emit light directly out of the display surface of the backlight. In this way, the LEDs are not directly viewed, and light emitted by the LEDs can be diffused by at least one reflection off a reflective surface in the LED backlight before the light is emitted out of the display surface of the LED backlight. Thus, this disclosure describes an LED backlight illuminated display surface that provides uniform illumination of the display surface so that bright spots caused by the LEDs are not visible from the display surface.

Accordingly, the present disclosure is directed generally to LED backlights, and particularly to LED backlights that include an array of LEDs that are disposed on an optical film within the LED backlight. The LEDs can be rear facing such that the emitted light is directed away from the optical film, and the optical film manages the LED emitted light returning from reflective surfaces in the backlight so that the light emitted from the display is enhanced. In addition, the optical film can assist in redirecting light passing through such films to help conceal the location of the rear facing LEDs and the associated electrical traces disposed on the optical film. While the present disclosure is not so limited, an appreciation of various aspects of the disclosure will be gained through a discussion of the examples provided herein.

The following description should be read with reference to the drawings, in which like elements in different drawings are numbered in like fashion. The drawings, which are not necessarily to scale, depict selected illustrative embodiments and are not intended to limit the scope of the disclosure. Although examples of construction, dimensions, and materials are illustrated for the various elements, those skilled in the art will recognize that many of the examples provided have suitable alternatives that may be utilized.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Figure 5:
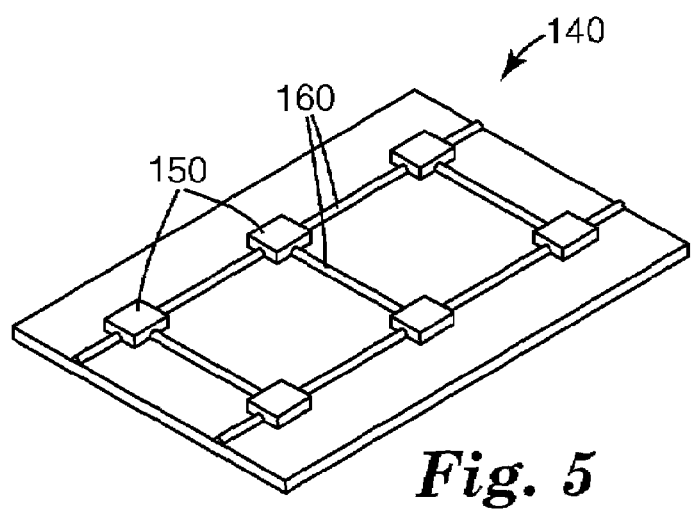
FIG. 5 is a schematic perspective view of an illustrative optical film construction useful in the LED backlight of FIG. 1.

FIG. 1 is a schematic cross-sectional diagram of one illustrative LED backlight 100. FIG. 5 is a schematic perspective view of an illustrative optical film 140 useful in the LED backlight 100 of FIG. 1. The backlight 100 includes a housing 110 having a plurality of internal surfaces. At least one of the internal surfaces is a light emission surface 120 and an opposing surface is a reflective surface 130. The illustrated backlight 100 includes opposing side surfaces 125. The backlight can also include opposing side surfaces substantially parallel to the plane of the figure. The opposing side surfaces 125, light emission surface 120, and reflective surface 130 cooperate to form a light box or enclosed backlight.

The light emission surface 120 can be formed of any material that allows for transmission of the desired emitted light. In some embodiments, the light emission surface 120 is a diffusely transmissive surface or translucent surface.

The reflective surface 130 is preferably highly reflective for enhanced backlight efficiency. For example, the reflective surface 130 may have an average reflectivity for visible light emitted by an array of LEDs 150 of at least 90%, 95%, 98%, 99%, or more. The reflective surface 130 can be a predominantly specular, diffuse, or combination specular/diffuse reflector, whether spatially uniform or patterned. In some cases, the reflective surface 130 can be made from a stiff metal substrate with a high reflectivity coating or a high reflectivity film laminated to a supporting substrate. Suitable high reflectivity materials include Vikuiti™ Enhanced Specular Reflector (ESR) multilayer optical film available from 3M Company; a film made by laminating a barium sulfate-loaded polyethylene terephthalate film (2 mils thick) to Vikuiti™ ESR film using a 0.4 mil thick isooctylacrylate acrylic acid pressure sensitive adhesive, the resulting laminate film referred to herein as "EDR II" film; 3M™ Light Enhancement Film available from 3M Company; E-60 series Lumirror™ polyester film available from Toray Industries, Inc.; porous polytetrafluoroethylene (PTFE) films, such as those available from W. L. Gore & Associates, Inc.; Spectralon™ reflectance material available from Labsphere, Inc.; Miro™ anodized aluminum films (including Miro™ 2 film) available from Alanod Aluminum-Veredlung GmbH & Co.; MCPET high reflectivity foamed sheeting from Furukawa Electric Co., Ltd.; and White Refstar™ films and MT films available from Mitsui Chemicals, Inc. In some embodiments, the reflective surface 130 can include diffusely reflective paint.

The reflective surface 130 may be substantially flat and smooth, or it may have a structured surface associated with it to enhance light scattering or mixing. Such a structured surface can be imparted (a) on the reflective surface, or (b) on a transparent coating applied to the reflective surface 130. In the former case, a highly reflecting film may be laminated to a substrate in which a structured surface was previously formed, or a highly reflecting film may be laminated to a flat substrate (such as a thin metal sheet, as with Vikuiti™ Durable Enhanced Specular Reflector-Metal (DESR-M) reflector available from 3M Company) followed by forming the structured surface, such as with a stamping operation. In the latter case, a transparent film having a structured surface can be laminated to a flat reflective surface, or a transparent film can be applied to the reflector and then afterwards a structured surface imparted to the top of the transparent film.

An optical film 140 is disposed between the light emission surface 120 and the reflective surface 130. The optical film 140 can include at least one of any suitable optical film or layer, e.g., a diffusing film, a reflective polarizing film, a multilayer optical film, or a structured surface film. The array of LEDs 150 is disposed on the optical film 140. The array of LEDs 150 can be mounted to the optical film 140 by any useful technique such as, for example, mechanical fastening, soldering, or adhering the LED 150 to the optical film 140 with an adhesive.

The LEDs that form the array of LEDs 150 are in electrical communication such that the LEDs can operate in a series or parallel manner or a combination of series and parallel as desired. At least one LED of the array of LEDs 150 has an illumination field that is directed toward the reflective surface 130. In some embodiments, each LED of the array of LEDs 150 has an illumination field that is directed toward the reflective surface 130.

"Light emitting diode" or "LED" refers to a diode that emits light, whether visible, ultraviolet, or infrared. It includes incoherent LED dies, or encased or encapsulated semiconductor devices marketed as "LEDs", whether of the conventional or super radiant variety, and whether of the forward-emitting or side-emitting variety, the latter of which is often advantageous in display applications. If the LED emits non-visible light such as ultraviolet light, and in some cases where it emits visible light, it can be packaged to include an organic or inorganic phosphor (or it may illuminate a remotely disposed phosphor) to convert short wavelength light to longer wavelength visible light, in some cases yielding a device that emits white light. An "LED die" is an LED in its most basic form, i.e., in the form of an individual component or chip made by semiconductor processing procedures. For example, the LED die is ordinarily formed from a combination of one or more Group III elements and of one or more Group V elements (III-V semiconductor). Examples of suitable III-V semiconductor materials include nitrides, such as gallium nitride, and phosphides, such as indium gallium phosphide. Other types of III-V materials can be used also, as might inorganic materials from other groups of the periodic table. The component or chip can include electrical contacts suitable for application of power to energize the device. The individual layers and other functional elements of the component or chip are typically formed on the wafer scale, and the finished wafer can then be diced into individual piece parts to yield a multiplicity of LED dies. The LED die may be configured for surface mount, chip-on-board, flip chip, or other known mounting configurations. Some packaged LEDs are made by forming a polymer encapsulant formed over an LED die and an associated reflector cup.

As illustrated in FIG. 5, the LEDs of the array of LEDs 150 are in electrical communication via electrical conductors 160. The electrical conductors 160 include a supply conductor and a ground conductor. It is understood that the electrical conductors 160 can be arranged in any useful configuration and are not limited to the configuration illustrated in FIG. 5. The electrical conductors 160 can be disposed on or within the optical film 140 using any suitable technique.

Conductive ink (e.g., silver ink, copper ink, nickel-based ink) can form the electrical conductors 160. Conductive ink can be silk screened or printed onto the optical film 140. Another method of forming the conductors 160 on the optical film 140 includes laminating copper foil to the optical film 140, coating with photoresist, covering with a photomask with the desired conductor 160 circuit pattern, exposing the film to UV light, removing the unexposed photoresist, etching away the non-circuit copper, and finally removing the remaining photoresist to reveal the conductor 160 circuits. A further method of forming the conductors 160 on the optical film 140 includes printing silver ink, carbon ink, or indium tin oxide ink, and then electrolessly plating the silver ink, carbon ink, or indium tin oxide inks with copper or nickel to from the conductor 160 circuits.

The optical films 140 described herein are films that transmit light and alter or manage light that is incident on the optical film. The term "optical film" will be used herein to refer to any reflective or partially reflective film or layer designed to exhibit desired reflection, transmission, scattering, absorption, or refraction of light upon exposure to a specific band of wavelengths of electromagnetic energy. Thus conventional normally transparent polymeric films, such as polyester and polypropylene, are not considered "optical films" for the purposes of this disclosure, even though such films may exhibit some degree of reflectance, or glare, when viewed from some angles. Films that exhibit both reflective and transmissive properties, however, such as those that are partially transmissive, are considered within the scope of the disclosure. In addition, films that are mostly transmissive but highly diffusive are considered within the scope of this disclosure. In some embodiments, optical polymer films for use herein generally absorb less than 25 percent of the radiant energy that impacts the film's surface. If the optical films are colored by means of the introduction of colorants into the film, however, greater amounts of radiant energy may be absorbed by the colorant materials. In some embodiments, the radiant energy absorbed is less than 10 percent or less than 5 percent. The radiant energy, typically expressed as the energy in a range of wavelengths, may be reflected either specularly or diffusely. The reflectance may be isotropic, i.e., the film has the same reflective properties along both in-plane axes, or may be anisotropic, i.e., the film has different reflective properties along the orthogonal in-plane axes. The difference in reflective properties along the in-plane axes can be varied by controlling the relationship between the indices of refraction along each axis for each of the component materials. In some embodiments, the optical film can include at least one of any suitable optical film or layer, e.g., a diffusing film, a reflective polarizing film, a multilayer optical film, and a structured surface film.

Any suitable diffusing film or films can be included in the optical film 140. The diffusing films can be a polymeric matrix of polymethyl methacrylate (PMMA) or polyvinyl chloride or other polymeric material with a variety of dispersed phases that include glass, polystyrene beads, $TiO_2$ and $CaCO_3$ particles. Exemplary diffusing films can include 3M™ Scotchcal™ Diffuser Film, types 3635-30 and 3635-70, available from 3M Company, St. Paul, Minn.

Any suitable type of reflective polarizing film may be included in the optical film 140, e.g., multilayer optical film (MOF) reflective polarizers, diffusely reflective polarizing film (DRPF), such as continuous/disperse phase polarizers, wire grid reflective polarizers, or cholesteric reflective polarizers.

Both the MOF and continuous/disperse phase reflective polarizing films rely on the difference in refractive index between at least two materials, usually polymeric materials, to selectively reflect light of one polarization state while transmitting light in an orthogonal polarization state. Some examples of MOF reflective polarizing films are described in co-owned U.S. Pat. No. 5,882,774 (Jonza et al.). Commercially available examples of MOF reflective polarizing films include Vikuiti™ DBEF-D200 and DBEF-D440 multilayer reflective polarizers that include diffusive surfaces, available from 3M Company.

Examples of DRPF useful in connection with the present disclosure include continuous/disperse phase reflective polarizing films as described, e.g., in co-owned U.S. Pat. No. 5,825,543 (Ouderkirk et al.), and diffusely reflecting multilayer polarizing films as described, e.g., in co-owned U.S. Pat. No. 5,867,316 (Carlson et al.). Other suitable types of DRPF are described in U.S. Pat. No. 5,751,388 (Larson).

Some examples of wire grid polarizing films useful in connection with the present disclosure include those described, e.g., in U.S. Pat. No. 6,122,103 (Perkins et al.). Wire grid polarizers are commercially available from, inter alia, Moxtek Inc., Orem, Utah.

Some examples of cholesteric polarizing films useful in connection with the present disclosure include those described, e.g., in U.S. Pat. No. 5,793,456 (Broer et al.), and U.S. Patent Publication No. 2002/0159019 (Pokomy et al.). Cholesteric polarizers are often provided along with a quarter wave retarding layer on the output side so that the light transmitted through the cholesteric polarizer is converted to linearly polarized light.

Multilayer optical films include multilayered films and films composed of blends of two or more polymeric materials. In some embodiments, these multilayer optical films are birefringent and orientated. Multilayer films provide reflective and transmissive properties through a multiplicity of layers that each have a thickness on the order of a fraction of the distance corresponding to a wavelength of light, and are useful in reflective applications. Multilayer optical films include polarizers. Other types of MOF films can be included in optical film 140, e.g., visible and infrared mirrors, such as those described in U.S. Pat. No. 5,882,774 (Jonza et al.). Multilayer optical films include color shifting films characterized by a uniform change in color as a function of viewing angle, such as those described in U.S. Pat. No. 6,531,230 (Weber et al.). Multilayer optical films include mirror films that have regions on the film that have higher coupling efficiencies on each side of the film and thus provide a higher degree of transmission than other regions of the film, such as those described in U.S. Pat. No. 6,208,466 (Liu et al.). Multilayer optical film includes embossed or thermally embossed optical films, such as those described in U.S. Pat. No. 6,096,247 (Ulsh et al.). Multilayer optical film can be planar or nonplanar, such as those described in U.S. Pat. No. 6,788,463 (Merrill et al.).

The optical film 140 can also include one or more structured surfaces films. Structured surface films include films that have a major prismatic or lenticular surface where the prisms have sharp, rounded, or flat tips and can be referred to as brightness enhancing films, such as those described in U.S. Pat. No. 6,354,709 (Campbell et al.); U.S. Pat. No. 6,846,089 (Stevenson et al.); U.S. Pat. No. 6,052,164 (Cobb et al.); and U.S. Patent Publication 2006/0146562 (Ko et al) (showing rounded structures, however discrete prismatic structures may be utilized also). Structured surface films includes films that have light diffusion properties imparted by an uneven structured surface formed by particles, such as those described in U.S. Pat. No. 6,771,335 (Kimura et al.).

Examples of suitable structured surface films include commercial one-dimensional (linear) prismatic polymeric films such as Vikuiti™ brightness enhancement films (BEF), Vikuiti™ transmissive right angle films (TRAF), Vikuiti™ image directing films (IDF), Vikuiti™ optical lighting films (OLF), all available from 3M Company, as well as conventional lenticular linear lens arrays.

Further examples of suitable structured surface films, where the structured surface has a two-dimensional character, include cube corner surface configurations such as those disclosed in U.S. Pat. No. 4,588,258 (Hoopman), U.S. Pat. No. 4,775,219 (Appeldorn et al.), U.S. Pat. No. 5,138,488 (Szczech), U.S. Pat. No. 5,122,902 (Benson), U.S. Pat. No. 5,450,285 (Smith et al.), and U.S. Pat. No. 5,840,405 (Shusta et al.); inverted prism surface configurations such as described in U.S. Pat. No. 6,287,670 (Benson et al.) and U.S. Pat. No. 6,280,822 (Smith et al.); structured surface films disclosed in U.S. Pat. No. 6,752,505 (Parker et al.) and U.S. Patent Publication No. 2005/0024754 (Epstein et al.); and beaded sheeting such as that described in, for example, U.S. Pat. No. 6,771,335 (Kimura et al.).

In general, the optical films of the present disclosure can assist in redirecting light passing through such films to help conceal the location of the rear-facing LEDs and the associated electrical traces disposed on the optical films. Additionally, in some embodiments, the optical films can enhance the light emitted from the display or sign. For example, the optical films can include a brightness enhancing film that includes a surface structure that redirects off-axis light in a direction closer to the axis of the display or sign, thereby increasing the brightness of the image seem by the viewer. One example of a brightness enhancing film is a prismatic brightness enhancing film that can include a number of prismatic ridges that redirect the light through refraction and reflection, e.g., BEF films available from 3M Company.

Figure 2:
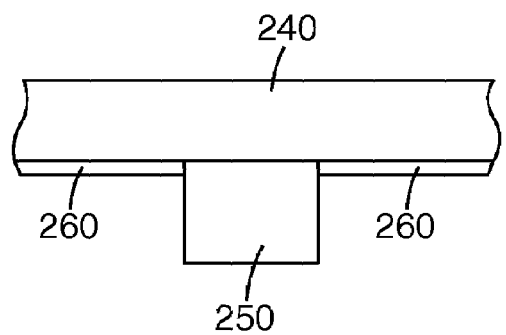
FIG. 2 is a schematic cross-sectional diagram portion of an illustrative optical film and attached LED.

FIG. 2 is a schematic cross-sectional diagram portion of an illustrative multilayer optical film 240 and attached LED 250. Conductors 260 are shown disposed on the optical film 240 on the same surface as the LED 250. However, these conductors can be disposed on a surface opposing the surface the LED 250 is mounted to, as desired.

Figure 3:
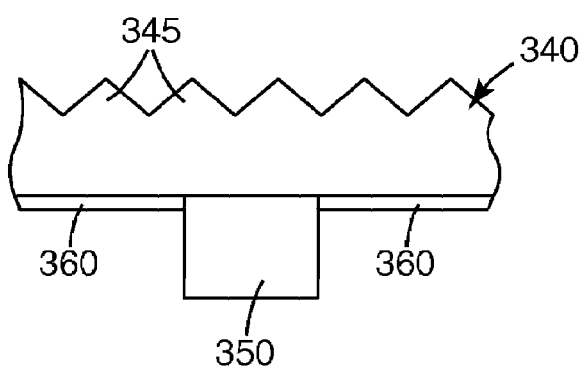
FIG. 3 is a schematic cross-sectional diagram portion of another illustrative optical film and attached LED.

FIG. 3 is a schematic cross-sectional diagram portion of another illustrative optical film 340 and attached LED 350. Conductors 360 are shown disposed on the optical film 340 on the same surface as the LED 350. However, these conductors can be disposed on a surface opposing the surface the LED 350 is mounted to, as desired. In some embodiments, the structured surface film is a brightness enhancing film that has a plurality of prismatic structures 345 disposed on one side of the optical film 340. In some of these embodiments, the LED 350 is disposed on a planar surface (opposing the structured surface) of the structured surface film 340. In other embodiments, the LEDs can be attached to the structured surface with the planar surface facing the light emission surface (e.g., light emission surface 120 of FIG. 1).

Figure 4:
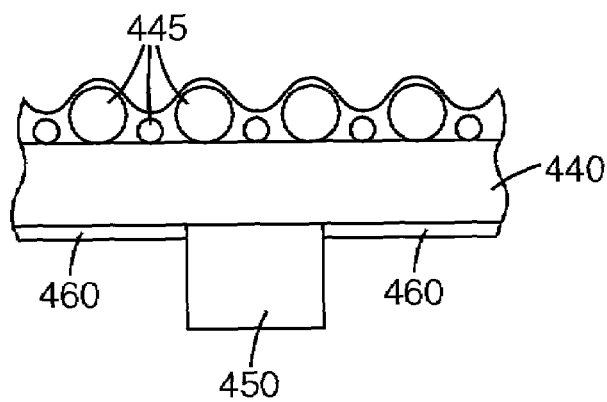
FIG. 4 is a schematic cross-sectional diagram portion of a further illustrative optical film and attached LED.

FIG. 4 is a schematic cross-sectional diagram portion of a further illustrative optical film 440 and attached LED 450. Conductors 460 are shown disposed on the optical film 440 on the same surface as the LED 450. However, these conductors can be disposed on a surface opposing the surface the LED 450 is mounted to, as desired. In some embodiments, the structured surface film is a beaded gain diffuser film that has a plurality of bead particles 445 dispersed in a binder material that is disposed on one side of the optical film 440. Further, in some embodiments, the LEDs can be attached to the beaded surface with the planar surface facing the light emission surface (e.g., light emission surface 120 of FIG. 1).

Figure 6:
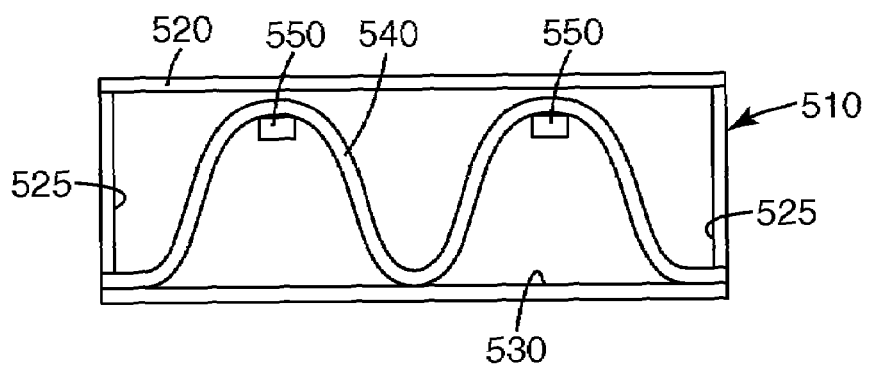
FIG. 6 is a schematic cross-sectional diagram portion of one illustrative LED backlight assembly.

FIG. 6 is a schematic cross-sectional diagram portion of one illustrative LED backlight assembly. Similar to FIG. 1, the assembly includes a housing 510 having a plurality of internal surfaces. At least one of the internal surfaces is a light emission surface 520, and an opposing surface is a reflective surface 530. The illustrated assembly includes a opposing side surfaces 525. The opposing side surfaces 525, light emission surface 520, and reflective surface 530 cooperate to form a light box or enclosed backlight. All of the design considerations and possibilities for the housing 110, the light transmission surface 120, the reflective surface 130, and the opposing side surfaces 125 of the embodiment illustrated in FIG. 1 apply equally to the housing 510, the light emission surface 520, the reflective surface 530, and the opposing side surfaces 525 of the embodiment illustrated in FIG. 6.

A corrugated optical film 540 is disposed between the light emission surface 520 and the reflective surface 530. The corrugated optical film 540 can be any suitable optical film described herein. An array of LEDs 550 is disposed on the optical film 540. The LEDs of the array of LEDs 550 can be mounted to the corrugated optical film 540 by any useful technique such as, for example, mechanical fastening, soldering, or adhering the LED 550 to the optical film 540 with an adhesive. As described herein, the LEDs that form the array of LEDs 550 are in electrical communication such that the LEDs can operate in a series or parallel manner or a combination of series and parallel as desired. The LEDs can be any suitable LED described herein. At least one LED of the array of LEDs 550 has an illumination field that is directed toward the reflective surface 530. In some embodiments, each LED of the array of LEDs 550 has an illumination field that is directed toward the reflective surface 530. The optical film can be corrugated as described in U.S. Pat. No. 6,788,463 (Merrill et al.).

In this embodiment, portions of the corrugated optical film 540 are in contact with the housing 510 and specifically in contact with the reflective surface 530. In an alternative embodiment, the optical film 540 can have thermoformed protrusions extending from a major surface of the optical film as described in U.S. Pat. No. 6,788,463 and these protrusions can be in contact with the diffusely reflective surface, as desired.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

The invention claimed is:
1. An LED backlight assembly comprising:
a housing having a plurality of internal surfaces, at least one of the internal surfaces is a light emission surface and an opposing surface is a reflective surface;
an optical film disposed between the light emission surface and the reflective surface, the optical film comprising at least one of a diffusing film, a reflective polarizing film, a multilayer optical film, and a structured surface film; and an array of LEDs in electrical communication disposed on the optical film, wherein at least one LED of the array of LEDs has an illumination field that is directed toward the reflective surface the array of LEDs are in electrical connection with conductors, and the conductors are disposed on the optical film.

2. The assembly of claim 1, wherein the reflective surface comprises a diffusely reflective surface.

3. The assembly of claim 1, wherein the optical film is a multilayer optical film comprising a brightness enhancing film.

4. The assembly of claim 1, wherein the optical film is a reflective polarizing film.

5. The assembly of claim 1, wherein the optical film is a multilayer optical film comprising a mirror film.

6. The assembly of claim 5, wherein the mirror film comprises regions on the film that have a higher degree of light transmission than other regions of the film.

7. The assembly of claim 1, wherein the optical film is a structured surface film.

8. The assembly of claim 7, wherein the structured surfaced film comprises an embossed film.

9. The assembly of claim 1, wherein the optical film is a diffusing film.

10. The assembly of claim 1, wherein the light emission surface is a diffusely transmissive surface.

11. The assembly of claim 1, wherein the optical film is corrugated and portions of the corrugated optical film contact the reflective surface.

12. The assembly of claim 1, wherein the optical film is a reflective polarizing film.

13. A method of making a backlight assembly comprising:
providing a housing having a plurality of internal surfaces, at least one of the internal surfaces is a light emission surface and an opposing surface is a reflective surface;
disposing an array of LEDs and conductors on an optical film, the optical film comprising at least one of a diffusing film, a reflective polarizing film, a multilayer optical film, and a structured surface film; and
placing the optical film between the light emission surface and the reflective surface such that at least one LED of the array of LEDs has an illumination field directed toward the reflective surface.

14. The method of claim 13, wherein the disposing step comprises disposing the array of LEDs and conductors on the optical film, wherein the LEDs of the array of LEDs are in electrical connection with conductors.

15. The method of claim 13, further comprising thermoforming the optical film to form a non-planar thermoformed optical film.

16. The method of claim 13, further comprising thermoforming the optical film to form a corrugated thermoformed optical film.

17. The method of claim 13, further comprising thermoforming the optical film to form a non-planar thermoformed optical film and the placing step comprises placing the optical film between the light emission surface and the reflective surface such that portions of the non-planar thermoformed optical film are disposed on the reflective surface.

18. The method of claim 13, wherein the reflective surface comprises a diffusely reflective surface.

19. An LED backlight assembly comprising:
a housing having a plurality of internal surfaces, at least one of the internal surfaces is a light emission surface and an opposing surface is a reflective surface;
an optical film disposed between the light emission surface and the reflective surface, the optical film comprising at least one of a diffusing film, a reflective polarizing film, a multilayer optical film, and a structured surface film, wherein the optical film is non-planar and portions of the optical film are disposed on the reflective surface; and
an array of LEDs in electrical communication disposed on the optical film, wherein at least one LED of the array of LEDs has an illumination field that is directed toward the reflective surface and the array of LEDs are in electrical connection with conductors, and the conductors are disposed on the optical film.

20. The assembly of claims 19, wherein the reflective surface comprises a diffusely reflective surface.

* * * * *

UNITED STATES PATENT AND TRADEMARK OFFICE
CERTIFICATE OF CORRECTION

PATENT NO.         : 7,481,563 B2
APPLICATION NO.    : 11/534028
DATED              : January 27, 2009
INVENTOR(S)        : John R. David It is certified that error appears in the above-identified patent and that said Letters Patent is hereby corrected as shown below:

Title Page
Item [74], Attorney, Agent or Firm, Delete "Bank" and insert -- Blank --, therefor.

Column 6
Line 28, Delete "(Pokomy" and insert -- (Pokorny --, therefor.

Column 10
Line 38, In Claim 20, delete "claims" and insert -- claim --, therefor.

Signed and Sealed this

Thirtieth Day of June, 2009

JOHN DOLL
*Acting Director of the United States Patent and Trademark Office*